United States Patent
Chao et al.

(10) Patent No.: US 8,566,501 B2
(45) Date of Patent: Oct. 22, 2013

(54) CIRCUIT FOR SIMULTANEOUSLY ANALYZING PERFORMANCE AND BUGS AND METHOD THEREOF

(75) Inventors: Hsuan-Ching Chao, Keelung (TW); Cheng-Pin Huang, Taoyuan County (TW); Yu-Chiun Lin, Taipei (TW); Chia-Chun Chiang, Chiayi (TW)

(73) Assignee: Etron Technology, Inc., Hsinchu (TW)

( * ) Notice: Subject to any disclaimer, the term of this patent is extended or adjusted under 35 U.S.C. 154(b) by 187 days.

(21) Appl. No.: 13/233,008

(22) Filed: Sep. 14, 2011

(65) Prior Publication Data

US 2012/0079161 A1 Mar. 29, 2012

Related U.S. Application Data

(60) Provisional application No. 61/386,572, filed on Sep. 27, 2010.

(51) Int. Cl.
*G06F 13/00* (2006.01)

(52) U.S. Cl.
USPC .......................................... 710/315; 714/37

(58) Field of Classification Search
USPC .............. 710/306, 311, 315; 714/37, 43, 712
See application file for complete search history.

(56) References Cited

U.S. PATENT DOCUMENTS

| | | | | |
|---|---|---|---|---|
| 6,321,331 | B1 * | 11/2001 | Roy et al. | 712/244 |
| 7,249,286 | B1 * | 7/2007 | Krishnan | 714/39 |
| 8,296,254 | B2 * | 10/2012 | Yamaoka | 706/47 |
| 2002/0013893 | A1 * | 1/2002 | Roy et al. | 712/227 |
| 2011/0078518 | A1 * | 3/2011 | Foster et al. | 714/57 |
| 2012/0166692 | A1 * | 6/2012 | Wang et al. | 710/105 |

* cited by examiner

*Primary Examiner* — Glenn A Auve
(74) *Attorney, Agent, or Firm* — Winston Hsu; Scott Margo

(57) ABSTRACT

A circuit for simultaneously analyzing performance and bugs includes a mapping unit and a USB 3.0 data flow analyzer. The mapping unit is used for mapping commands transmitted to a USB 3.0 host through a peripheral component interconnect express and internal events of the USB 3.0 host to a packet of a USB 3.0 bus. The USB 3.0 data flow analyzer is used for analyzing performance and bugs of the USB 3.0 host through the packet of the USB 3.0 bus.

6 Claims, 2 Drawing Sheets

CIRCUIT FOR SIMULTANEOUSLY ANALYZING PERFORMANCE AND BUGS AND METHOD THEREOF

CROSS REFERENCE TO RELATED APPLICATIONS

This application claims the benefit of U.S. Provisional Application No. 61/386,572, filed on Sep. 27, 2010 and entitled "Sync technology for XHCI command and USB3 data transfer," the contents of which are incorporated herein by reference.

BACKGROUND OF THE INVENTION

1. Field of the Invention

The present invention is related to a circuit for simultaneously analyzing performance and bugs and related method thereof, and particularly to a circuit and method thereof that can utilize packets of a USB 3.0 bus to simultaneously analyze performance and bugs.

2. Description of the Prior Art

In the prior art, a user has to observe data transmission conditions between a USB 3.0 host and a USB 3.0 device through a USB 3.0 data flow analyzer, and determine how much time is spent by the USB 3.0 host to execute commands to analyze performance of the USB 3.0 host through a data flow analyzer of a peripheral component interconnect express (PCIE) interface after the USB 3.0 host receives the commands transmitted by the peripheral component interconnect express interface. In addition, when the user analyzes bugs of the USB 3.0 host, the user usually needs to analyze data transmitted between the USB 3.0 host and the USB 3.0 device, and data in the peripheral component interconnect express interface to discover the bugs of the USB 3.0 host. However, the prior art utilizes an artificial method to simultaneously execute the abovementioned operation for analyzing the performance of the USB 3.0 host and the bugs of the USB 3.0 host. Therefore, the prior art not only spends more time and has lower efficiency, but also needs the USB 3.0 data flow analyzer and the data flow analyzer of the peripheral component interconnect express interface to simultaneously work on analyzing the performance of the USB 3.0 host and the bugs of the USB 3.0 host.

SUMMARY OF THE INVENTION

An embodiment provides a circuit for simultaneously analyzing performance and bugs. The circuit includes a mapping unit and a USB 3.0 data flow analyzer. The mapping unit is used for mapping commands transmitted to a USB 3.0 host through a peripheral component interconnect express (PCIE) interface and internal events of the USB 3.0 host to a packet of a USB 3.0 bus. The USB 3.0 data flow analyzer is used for analyzing performance and bugs of the USB 3.0 host through the packet of the USB 3.0 bus.

Another embodiment provides a method for simultaneously analyzing performance and bugs. The method includes mapping commands transmitted to a USB 3.0 host through a peripheral component interconnect express interface and internal events of the USB 3.0 host to a packet of a USB 3.0 bus; and analyzing performance and bugs of the USB 3.0 host through the packet of the USB 3.0 bus.

The present invention provides a circuit for simultaneously analyzing performance and bugs and method thereof. The circuit and the method utilize a mapping unit to map commands transmitted to a USB 3.0 host through a peripheral component interconnect express interface and internal events of the USB 3.0 host to a packet of a USB 3.0 bus, and utilize a USB 3.0 data flow analyzer to analyze the performance and the bugs of the USB 3.0 host through the packet of the USB 3.0 bus. Therefore, the present invention not only simultaneously analyzes the performance and the bugs of the USB 3.0 host, but also has advantages of easier realization, lower cost, and higher efficiency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
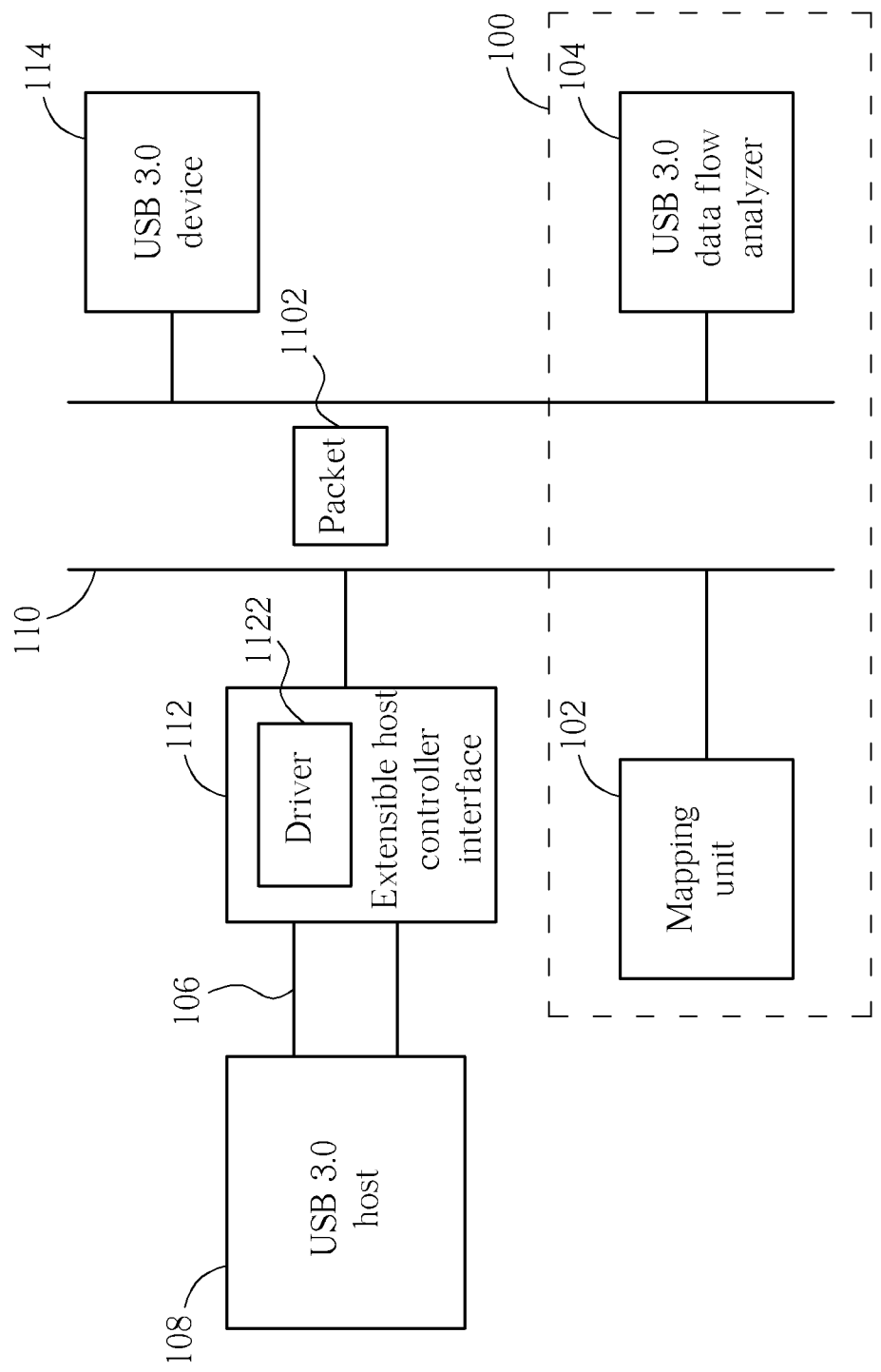
FIG. 1 is a diagram illustrating a circuit for simultaneously analyzing performance and bugs according to an embodiment.

Please refer to FIG. 1. FIG. 1 is a diagram illustrating a circuit 100 for simultaneously analyzing performance and bugs according to an embodiment. The circuit 100 includes a mapping unit 102 and a USB 3.0 data flow analyzer 104. The mapping unit 102 is used for mapping commands transmitted to a USB 3.0 host 108 through a peripheral component interconnect express (PCIE) interface 106 and internal events of the USB 3.0 host 108 to a packet 1102 of a USB 3.0 bus 110. The USB 3.0 data flow analyzer 104 is used for analyzing performance and bugs of the USB 3.0 host 108 through the packet 1102 of the USB 3.0 bus 110. The commands transmitted to the USB 3.0 host 108 through the peripheral component interconnect express interface 106 are commands of an extensible host controller interface (xHCI) 112, the packet 1102 of the USB 3.0 bus 110 is a ping packet, and the USB 3.0 host 108 can communicate with a driver 1122 of the extensible host controller interface 112 according to the commands transmitted to the USB 3.0 host 108 through the peripheral component interconnect express interface 106. But, the present invention is not limited to the packet 1102 of the USB 3.0 bus being the ping packet. In addition, the USB 3.0 host 108 still continues to transmit normal ping packets. The present invention only utilizes additional ping packets to analyze the performance and the bugs of the USB 3.0 host 108. Therefore, any USB 3.0 data flow analyzer that analyzes the performance and the bugs of the USB 3.0 host 108 through the packet 1102 of the USB 3.0 bus 110 falls within the scope of the present invention. In addition, the internal events of the USB 3.0 host 108 are scheduling events and flow control events of the USB 3.0 host 108.

The mapping unit 102 is used for adding a predetermined value to original addresses corresponding to the commands transmitted to the USB 3.0 host 108 through the peripheral component interconnect express interface 106 and the internal events of the USB 3.0 host 108 to generate new addresses corresponding to the commands transmitted to the USB 3.0 host 108 through the peripheral component interconnect express interface 106 and the internal events of the USB 3.0 host 108, where the predetermined value is 64. But, the present invention is not limited to the predetermined value being 64. That is to say, if a USB 3.0 device 114 defines a 7-bit address, the new addresses can not exceed 127. Then, the mapping unit 102 maps the commands transmitted to the USB 3.0 host 108 through the peripheral component interconnect express interface 106 and the internal events of the USB 3.0 host 108 to the packet 1102 of the USB 3.0 bus 110 according to the new addresses corresponding to the commands transmitted to the USB 3.0 host 108 through the peripheral component interconnect express interface 106 and the internal events of the USB 3.0 host 108. Therefore, the USB 3.0 device 114 does not receive the packet 1102 with the new address through the USB 3.0 bus 110. Meanwhile, a user can utilize the USB 3.0 data flow analyzer 104 to analyze the performance and the bugs of the USB 3.0 host 108 through the packet 1102 of the USB 3.0 bus 110.

Figure 2:
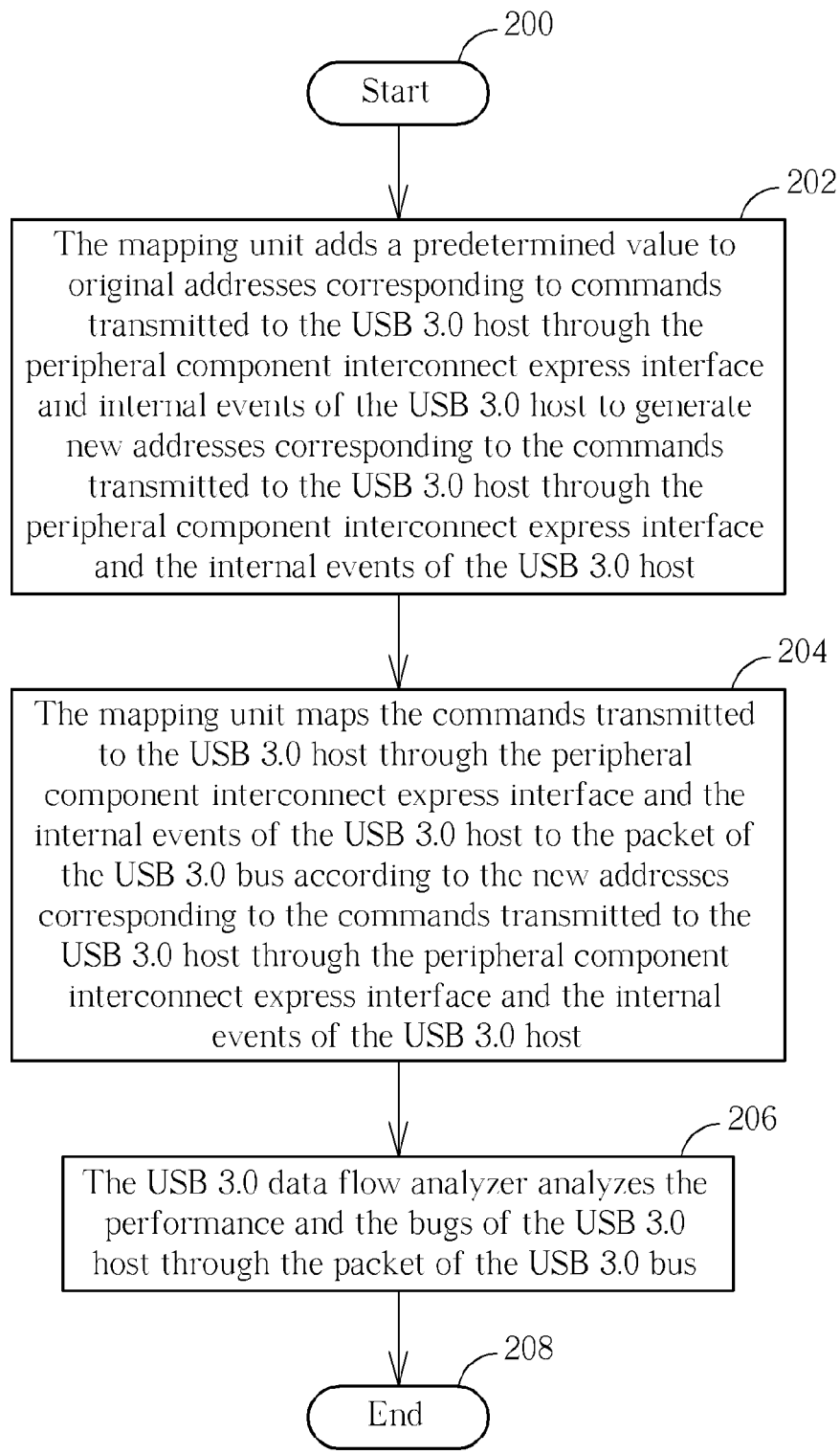
FIG. 2 is a flowchart illustrating a method for simultaneously analyzing performance and bugs according to another embodiment.

Please refer to FIG. 2. FIG. 2 is a flowchart illustrating a method for simultaneously analyzing performance and bugs according to another embodiment. The method in FIG. 2 is illustrated using the circuit 100 in FIG. 1. Detailed steps are as follows:

Step 200: Start.

Step 202: The mapping unit 102 adds a predetermined value to original addresses corresponding to commands transmitted to the USB 3.0 host 108 through the peripheral component interconnect express interface 106 and internal events of the USB 3.0 host 108 to generate new addresses corresponding to the commands transmitted to the USB 3.0 host 108 through the peripheral component interconnect express interface 106 and the internal events of the USB 3.0 host 108.

Step 204: The mapping unit 102 maps the commands transmitted to the USB 3.0 host 108 through the peripheral component interconnect express interface 106 and the internal events of the USB 3.0 host 108 to the packet 1102 of the USB 3.0 bus 110 according to the new addresses corresponding to the commands transmitted to the USB 3.0 host 108 through the peripheral component interconnect express interface 106 and the internal events of the USB 3.0 host 108.

Step 206: The USB 3.0 data flow analyzer 104 analyzes the performance and the bugs of the USB 3.0 host 108 through the packet 1102 of the USB 3.0 bus 110.

Step 208: End.

In Step 202, the predetermined value is 64. But, the present invention is not limited to the predetermined value being 64. In Step 204, the packet 1102 of the USB 3.0 bus 110 is a ping packet. But, the present invention is not limited to the packet 1102 of the USB 3.0 bus being the ping packet. In addition, the USB 3.0 host 108 still continues to transmit normal ping packets. The present invention only utilizes additional ping packets to analyze the performance and the bugs of the USB 3.0 host 108.

To sum up, the circuit for simultaneously analyzing the performance and the bugs and method thereof utilize the mapping unit to map the commands transmitted to the USB 3.0 host through the peripheral component interconnect express interface and the internal events of the USB 3.0 host to the packet of the USB 3.0 bus, and utilize the USB 3.0 data flow analyzer to analyze the performance and the bugs of the USB 3.0 host through the packet of the USB 3.0 bus. Therefore, the present invention not only simultaneously analyzes the performance and the bugs of the USB 3.0 host, but also has advantages of easier realization, lower cost, and higher efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit for simultaneously analyzing performance and bugs, the circuit comprising:
   a mapping unit for mapping commands transmitted to a USB 3.0 host through a peripheral component interconnect express (PCIE) interface and internal events of the USB 3.0 host to a packet of a USB 3.0 bus, wherein the commands transmitted to the USB 3.0 host through the peripheral component interconnect express interface are commands of an extensible host controller interface (xHCI) specified in an extensible host controller interface specification; and
   a USB 3.0 data flow analyzer for analyzing performance and bugs of the USB 3.0 host through executed conditions of the commands transmitted to the USB 3.0 host and the internal events stored in the packet of the USB 3.0 bus.

2. The circuit of claim 1, wherein mapping the commands transmitted to the USB 3.0 host through the peripheral component interconnect express interface and the internal events of the USB 3.0 host to the packet of the USB 3.0 bus comprises:
   adding a predetermined value to original addresses corresponding to the commands transmitted to the USB 3.0 host through the peripheral component interconnect express interface and original addresses corresponding to the internal events of the USB 3.0 host to generate new addresses corresponding to the commands transmitted to the USB 3.0 host through the peripheral component interconnect express interface and new addresses corresponding to the internal events of the USB 3.0 host; and
   mapping the commands transmitted to the USB 3.0 host through the peripheral component interconnect express interface and the internal events of the USB 3.0 host to the packet of the USB 3.0 bus according to the new addresses corresponding to the commands transmitted to the USB 3.0 host through the peripheral component interconnect express interface and the new addresses corresponding to the internal events of the USB 3.0 host.

3. The circuit of claim 1, wherein the packet of the USB 3.0 bus is a ping packet.

4. A method for simultaneously analyzing performance and bugs, the method comprising:
   mapping commands transmitted to a USB 3.0 host through a peripheral component interconnect express interface and internal events of the USB 3.0 host to a packet of a USB 3.0 bus, wherein the commands transmitted to the USB 3.0 host through the peripheral component interconnect express interface are commands of an extensible host controller interface (xHCI) specified in an extensible host controller interface specification; and
   analyzing performance and bugs of the USB 3.0 host through executed conditions of the commands transmitted to the USB 3.0 host and the internal events stored in the packet of the USB 3.0 bus.

5. The method of claim 4, wherein mapping the commands transmitted to the USB 3.0 host through the peripheral component interconnect express interface and the internal events of the USB 3.0 host to the packet of the USB 3.0 bus comprises:
   adding a predetermined value to original addresses corresponding to the commands transmitted to the USB 3.0 host through the peripheral component interconnect express interface and original addresses corresponding to the internal events of the USB 3.0 host to generate new addresses corresponding to the commands transmitted to the USB 3.0 host through the peripheral component interconnect express interface and new addresses corresponding to the internal events of the USB 3.0 host; and mapping the commands transmitted to the USB 3.0 host through the peripheral component interconnect express interface and the internal events of the USB 3.0 host to the packet of the USB 3.0 bus according to the new addresses corresponding to the commands transmitted to the USB 3.0 host through the peripheral component interconnect express interface and the new addresses corresponding to the internal events of the USB 3.0 host.

6. The method of claim 4, wherein the packet of the USB 3.0 bus is a ping packet.

* * * * *